US010921870B2

(12) United States Patent
Ou Yang et al.

(10) Patent No.: US 10,921,870 B2
(45) Date of Patent: Feb. 16, 2021

(54) SYSTEM AND METHOD FOR HYBRID POWER SUPPLY

(71) Applicant: QUANTA COMPUTER INC., Taoyuan (TW)

(72) Inventors: Kuang-Hua Ou Yang, Taoyuan (TW); Shu-Chen Ni, Taoyuan (TW); Chin-Hsiang Chan, Taoyuan (TW); Wen-Kai Lee, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 79 days.

(21) Appl. No.: 16/140,669

(22) Filed: Sep. 25, 2018

(65) Prior Publication Data
US 2020/0097059 A1   Mar. 26, 2020

(51) Int. Cl.
*G06F 1/26* (2006.01)
*G06F 1/3206* (2019.01)
*H02J 9/06* (2006.01)

(52) U.S. Cl.
CPC ............ *G06F 1/263* (2013.01); *G06F 1/3206* (2013.01); *H02J 9/06* (2013.01); *H02J 9/068* (2020.01)

(58) Field of Classification Search
CPC ........ G06F 1/26; G06F 1/3203; G06F 1/3206; G06F 1/3287; G06F 1/18; G06F 1/28; G06F 1/263
USPC ................ 713/300, 340, 320, 324, 310, 330
See application file for complete search history.

(56) References Cited

U.S. PATENT DOCUMENTS

| 5,739,594 | A | * | 4/1998 | Sheppard | ................ H02J 9/06 307/64 |
| 7,356,386 | B2 | * | 4/2008 | Shin | ....................... G06F 1/206 700/300 |
| 9,778,717 | B2 | | 10/2017 | Kaplan | |
| 10,146,285 | B2 | | 12/2018 | Huang et al. | |
| 2002/0084697 | A1 | * | 7/2002 | Radusewicz | ............. H02J 9/06 307/64 |

(Continued)

FOREIGN PATENT DOCUMENTS

| CN | 104049709 A | 9/2014 |
| CN | 104794033 A | 7/2015 |

(Continued)

OTHER PUBLICATIONS

Extended European Search Report for EP Application No. 19166370.7, dated Nov. 5, 2019.

(Continued)

*Primary Examiner* — Faisal M Zaman
(74) *Attorney, Agent, or Firm* — Nixon Peabody LLP

(57) ABSTRACT

The present disclosure provides a system and method for dynamically defining a specific input pin of a management controller (e.g., a baseboard management controller (BMC)) of a server system in response to a new device being plugged into the server system. The new device comprises one of a power supply unit (PSU), an automatic transfer switch (ATS), or a battery backup unit (BBU) of the server system. In some implementations, the PSU, the ATS, and the BBU are modularized into a plurality of ATS modules, a plurality of PSU modules, and a plurality of BBU modules, respectively. Each of the plurality of ATS modules, the plurality of PSU modules, and the plurality of BBU modules has substantially the same physical size.

18 Claims, 5 Drawing Sheets

(56) References Cited

U.S. PATENT DOCUMENTS

| | | | |
|---|---|---|---|
| 2004/0098527 A1 | 5/2004 | Kwatra et al. | |
| 2008/0084680 A1* | 4/2008 | Islam | G06F 1/1632 361/788 |
| 2009/0284072 A1* | 11/2009 | Everett | H02J 9/06 307/23 |
| 2011/0062896 A1* | 3/2011 | Chou | H05B 47/16 315/362 |
| 2011/0278934 A1* | 11/2011 | Ghosh | H02J 9/062 307/66 |
| 2012/0017074 A1* | 1/2012 | Kelly | G06F 9/4411 713/100 |
| 2012/0110386 A1* | 5/2012 | Hancock | G01R 31/40 714/41 |
| 2013/0080793 A1* | 3/2013 | Familiant | H02J 9/005 713/300 |
| 2013/0275783 A1* | 10/2013 | Liu | G01R 31/382 713/310 |
| 2014/0281646 A1 | 9/2014 | Jau et al. | |
| 2015/0108225 A1* | 4/2015 | Gimeno Monge | G06K 19/0702 235/492 |
| 2015/0288222 A1* | 10/2015 | Bergman | H02M 1/32 307/64 |
| 2016/0127167 A1 | 5/2016 | Chou et al. | |
| 2016/0299770 A1* | 10/2016 | Doering | G06F 13/102 |
| 2017/0185495 A1 | 6/2017 | Jau et al. | |
| 2017/0237285 A1* | 8/2017 | Wang | H02J 9/061 307/66 |
| 2017/0265325 A1* | 9/2017 | Klikic | H05K 7/1489 |
| 2019/0004901 A1* | 1/2019 | Ryan | G06F 11/1441 |
| 2019/0012288 A1* | 1/2019 | Zhao | G06F 13/4282 |
| 2019/0026240 A1* | 1/2019 | Sachidanandam | G06F 13/36 |
| 2019/0036377 A1* | 1/2019 | Ou Yang | H02J 7/0063 |

FOREIGN PATENT DOCUMENTS

| | | |
|---|---|---|
| CN | 105373465 A | 3/2016 |
| CN | 205656280 U | 10/2016 |
| JP | 2014109805 A | 6/2014 |
| JP | 2014170354 A | 9/2014 |
| JP | 2016091557 A | 5/2016 |
| JP | 2016207201 A | 12/2016 |
| JP | 2017516445 A | 6/2017 |

OTHER PUBLICATIONS

System Management Bus (SMBus) Specification, 2014 System Management Interface Forum, Inc., System Management Bus (SMBus), Dec. 20 2014, 85 pages, Version 3.0, www.powerSIG.org., URL:http://smbus.org/specs/SMBus_3_0_20141220.pdf.

CN Office Action for Application No. 201910089901.5, dated Sep. 17, 2020, w/ First Office Action Summary.

CN Search Report for Application No. 201910089901.5, dated Sep. 17, 2020, w/ First Office Action.

JP Office Action for Application No. 2019-128483, dated Sep. 23, 2020, w/ First Office Action Summary.

\* cited by examiner

SYSTEM AND METHOD FOR HYBRID POWER SUPPLY

TECHNICAL FIELD

The disclosure generally relates to power supply systems.

BACKGROUND

Modern server farms or datacenters typically employ a large number of servers to handle processing needs for a variety of application services. Each server handles various operations and requires a certain level of power consumption to maintain these operations. Some of these operations are "mission critical" operations, interruptions to which may lead to significant security breach or revenue losses for users associated with these operations.

For example, an input AC power to power supply units (PSUs) of a server system may fail. A failure or a fault in the input AC power can force a sudden shutdown of a server system, possibly resulting in data loss or even damage to the server system. One solution is to use an automatic transfer switch (ATS) to switch the PSUs to a second AC input power when a first AC input power fails. Another solution is to replace an interrupted or failed power source with a battery backup system (BBU).

However, it remains a challenge to efficiently manage a server system with PSU(s), ATS, and/or BBU, and further improve reliability and cost of power supplies in the server system.

SUMMARY

Systems and methods, in accordance with various examples of the present disclosure, provide a solution to the above-mentioned problems by dynamically defining a specific input pin of a management controller (e.g., a baseboard management controller (BMC)) of a server system in response to a new device being plugged into the server system. The new device comprises one of a power supply unit (PSU), an automatic transfer switch (ATS), or a battery backup unit (BBU) of the server system. In some implementations, the PSU, the ATS, and the BBU are modularized into a plurality of ATS modules, a plurality of PSU modules, and a plurality of BBU modules, respectively—each of which has substantially the same physical size.

In some implementations, the specific input pin of the management controller is an #A22 input pin for SMBAlert. In response to determining that the new device is the BBU, the management controller can redefine the #A22 input pin to an output pin for the BBU. The management controller can manage the BBU by sending a control signal via the output pin. In some examples, the management controller can request the BBU to supply backup power to the server system via the output pin and a power management bus (PMBus). In some implementations, the management controller can request the BBU to supply power to support peak power demand from the server system. Thus, uninterruptible power supply (UPS) and/or redundant PSUs may not be needed in the server system.

In response to determining that the new device is the PSU, the management controller can define the #A22 input pin to the PSU; monitor a status of the PSU via the #A22 input pin; manage the PSU; and send a control signal to the BBU in an event that an AC power to the PSU fails. In response to determining that the new device is the ATS, the management controller can define the #A22 input pin to the ATS; monitor a status of the ATS via the #A22 input pin; manage the ATS; and send a control signal to the BBU in an event that AC power(s) to the ATS fails. In this design, one AC loop for the server system can be saved.

In accordance with one aspect of the present disclosure, a computer-implemented method for managing a server system, comprises: determining, by a management controller of the server system, a device being plugged in, the device comprising one of a PSU, an ATS, or a BBU of the server system; determining, by the management controller, an identification (ID) of the device; in response to determining the device is the BBU, redefining a specific input pin of the management controller to a BBU output pin; monitoring a status of the BBU; and managing the BBU by sending a first control signal via the BBU output pin.

In some implementations, the computer-implemented method for managing the server system, further comprises: in response to determining the device is the ATS, defining the specific input pin of the management controller to an ATS input pin; monitoring a status of the ATS via the ATS input pin; managing the ATS; and sending a second control signal to the BBU in response to an AC source failure signal. The source failure signal may indicate a condition that all of or all AC sources to the server system have failed, and/or the ATS has failed.

In some implementations, the computer-implemented method for managing the server system, further comprises: in response to determining the device is the PSU, defining the specific input pin of the management controller to a PSU input pin; monitoring a status of the PSU via the PSU input pin; managing the PSU; and sending a third control signal to the BBU in response to an AC failure signal. The AC failure signal may indicate a condition that an AC source connected to the PSU has failed, and/or the PSU has failed.

In accordance with another aspect of the present disclosure, a non-transitory computer-readable storage medium storing instructions is provided. The instructions, when executed by a processor, cause the processor to perform operations comprising: determining, by a management controller of the server system, a device being plugged in, the device comprising one of a PSU, an ATS, or a BBU of the server system; determining, by the management controller, an identification (ID) of the device; in response to determining the device is the BBU, redefining a specific input pin of the management controller to a BBU output pin; monitoring a status of the BBU; and managing the BBU by sending a first control signal via the BBU output pin.

In some implementations, the instructions, when executed by the processor, cause the processor to perform operations further comprising: in response to determining the device is the ATS, defining the specific input pin of the management controller to an ATS input pin; monitoring a status of the ATS via the ATS input pin; managing the ATS; and sending a second control signal to the BBU in response to an AC source failure signal.

In some implementations, the instructions, when executed by the processor, cause the processor to perform operations further comprising: in response to determining the device is the PSU, defining the specific input pin of the management controller to a PSU input pin; monitoring a status of the PSU via the PSU input pin; managing the PSU; and sending a third control signal to the BBU in response to an AC failure signal.

According to some configurations, the operation condition of components of the server system can be stored on memory, hard drive, or a flash memory device of the server system. The operation condition of the components can be accessed by a BMC, a rack management controller (RMC), or a central processing unit (CPU) on the server system. The flash memory device can be any storage medium configured to store program instructions or data for a period of time. According to some examples, the flash storage device can be a flash drive, a random access memory (RAM), a non-volatile random-access memory (NVRAM), an electrically erasable programmable read-only memory (EEPROM), or a mailbox register.

Additional features and advantages of the disclosure will be set forth in the description that follows, and will in part be obvious from the description; or can be learned by the practice of the principles set forth herein. The features and advantages of the disclosure can be realized and obtained by means of the instruments and combinations particularly pointed out in the appended claims.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

DETAILED DESCRIPTION

Figure 1A:
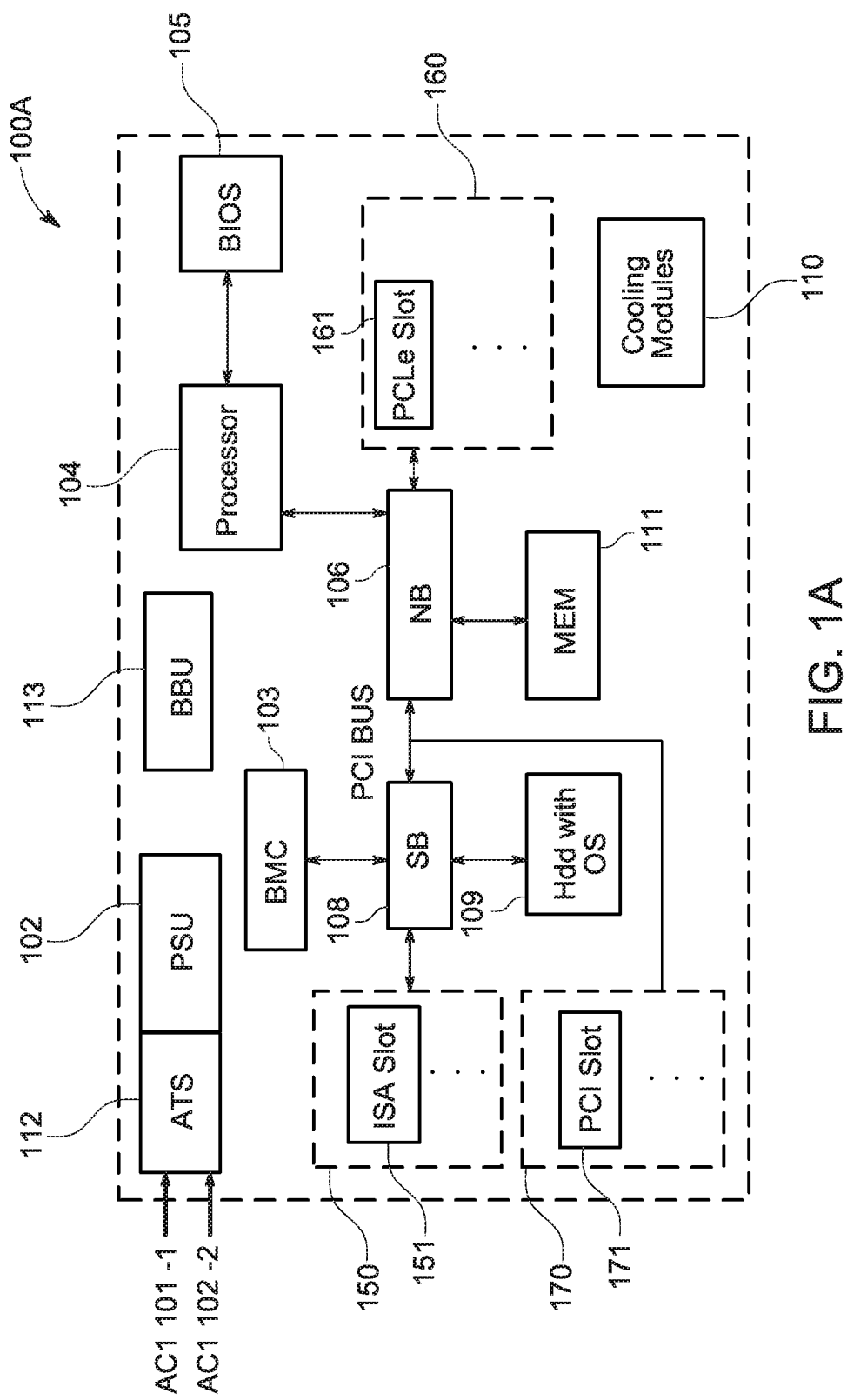
FIG. 1A is a schematic block diagram illustrating an exemplary system, in accordance with an implementation of the present disclosure.

The present disclosure can be embodied in many different forms. Representative embodiments are shown in the drawings, and will herein be described in detail. These embodiments are examples or illustrations of the principles of the disclosure but are not intended to limit its broad aspects. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Various examples of the present disclosure provide systems and methods for dynamically defining a specific input pin of a management controller of a server system in response to a new device being plugged into the server system. The new device comprises one of a power supply unit (PSU), an automatic transfer switch (ATS), or a battery backup unit (BBU) of the server system.

FIG. 1A is a schematic block diagram illustrating an exemplary server system 100A, in accordance with an implementation of the present disclosure. In this example, the server system 100A includes at least one microprocessor or processor 104; a BMC 103; an ATS 112; a BBU 113; one or more cooling modules 110; a main memory (MEM) 111; at least one power supply unit (PSU) 102 that receives an AC power from an AC power supply 101, and provides power to various components of the server system 100A, such as the processor 104, north bridge (NB) logic 106, PCIe slots 160, south bridge (SB) logic 108, storage device 109, ISA slots 150, PCI slots 170, and BMC 103. The ATS 112 is connected to an AC1 input 101-1 and an AC2 input 101-2, and the PSU 102. The BBU 113 is configured to provide backup power to the server system 100A. In some implementations, the BBU 113 is configured to supply power in response to a peak power demand from the server system 100A. In some implementations, the BBU 113 can supply backup power to the server systems when the PSU 102 has failed, or both AC1 input 101-1 and AC2 input 101-2 to the server system 100A are interrupted. In this example, there is no need to incorporate an uninterruptible power supply (UPS) in the server system 100A.

After being powered on, the server system 100A is configured to load a software application from memory, a computer storage device, or an external storage device to perform various operations. The storage device 109 is structured into logical blocks that are available to an operating system and applications of the server system 100A. The storage device 109 is configured to retain server data even when the server system 100A is powered off.

In FIG. 1A, the memory 111 is coupled to the processor 104 via the NB logic 106. The memory 111 may include, but is not limited to, dynamic random access memory (DRAM), double data rate DRAM (DDR DRAM), static RAM (SRAM), or other types of suitable memory. The memory 111 can be configured to store firmware data of the server system 100A. In some configurations, firmware data can be stored on the storage device 109.

In some implementations, the server system 100A can further comprise a flash storage device. The flash storage device can be a flash drive, a random access memory (RAM), a non-volatile random-access memory (NVRAM), or an electrically erasable programmable read-only memory (EEPROM). The flash storage device can be configured to store system configurations such as firmware data.

The processor 104 can be a central processing unit (CPU) configured to execute program instructions for specific functions. For example, during a booting process, the processor 104 can access firmware data stored in the BMC 103 or the flash storage device, and execute the BIOS 105 to initialize the server system 100A. After the booting process, the processor 104 can execute an operating system in order to perform and manage specific tasks for the server system 100A.

In some configurations, the processor 104 can be multi-core processors, each of which is coupled together through a CPU bus connected to the NB logic 106. In some configurations, the NB logic 106 can be integrated into the processor 104. The NB logic 106 can also be connected to a plurality of peripheral component interconnect express (PCIe) slots 160 and an SB logic 108 (optional). The plurality of PCIe slots 160 can be used for connections and buses such as PCI Express ×1, USB 2.0, SMBus, SIM card, future extension for another PCIe lane, 1.5 V and 3.3 V power, and wires to diagnostics LEDs on the server system 100A's chassis.

In system 100A, the NB logic 106 and the SB logic 108 are connected by a peripheral component interconnect (PCI) Bus 107. The PCI Bus 107 can support functions on the processor 104 but in a standardized format that is independent of any of the processor 104's native buses. The PCI Bus 107 can be further connected to a plurality of PCI slots 170 (e.g., a PCI slot 171). Devices connected to the PCI Bus 107 may appear to a bus controller (not shown) to be connected directly to a CPU bus; assigned addresses in the processor 104's address space; and synchronized to a single bus clock. PCI cards that can be used in the plurality of PCI slots 170 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 108 can couple the PCI Bus 107 to a plurality of expansion cards or ISA slots 150 (e.g., an ISA slot 151) via an expansion bus. The expansion bus can be a bus used for communications between the SB logic 108 and peripheral devices, and may include, but is not limited to, an industry standard architecture (ISA) bus, PC/104 bus, low pin count bus, extended ISA (EISA) bus, universal serial bus (USB), integrated drive electronics (IDE) bus, or any other suitable bus that can be used for data communications for peripheral devices.

In this example, BIOS 105 can be any program instructions or firmware configured to initiate and identify various components of the server system 100A. The BIOS is an important system component that is responsible for initializing and testing hardware components of a corresponding server system. The BIOS can provide an abstraction layer for the hardware components, thereby providing a consistent way for applications and operating systems to interact with a peripheral device such as a keyboard, a display, and other input/output devices.

In system 100A, the SB logic 108 is further coupled to the BMC 103 that is connected to the PSU 102. In some implementations, the BMC 103 can also be a rack management controller (RMC).

The BMC 103 is configured to monitor operation status of components of the server system 100A, and control the server system 100A based upon the operation status of the components. For example, the BMC 103 can monitor power being delivered to the PSU 102 and the ATS 112; power consumption of components of the server system 100A; internal temperatures of the server system 100A; and/or a temperature of a specific component of the server system 100A. Based upon the internal temperatures of the server system 100A or the temperature of the specific component, the BMC 103 may control the cooling modules 110 to increase or reduce cooling of the server system 100A or the specific component. In some implementations, the BMC 103 may scale down frequency and/or power consumption of specific components (e.g., the processor 104, the memory 111, the storage device 109 and/or bus) of the server system 100A.

In some implementations, the BMC 103 can request the BBU 113 to supply additional power to the server system 100A in response to a peak power demand from the system 100A. In some implementations, the BMC 103 can collect historical power usage and consumption data of the server system 100A and the PSU 102. The BMC 103 can analyze collected present and/or historical loading and power consumption information according to one or more machine-learning algorithms, and determine an optimized output power of the PSU 102, and/or additional power from the BBU 113 to support the peak power demand.

In some implementations, the one or more machine-learning algorithms can include at least one of a linear regression model, neural network model, support vector machine based model, Bayesian statistics, case-based reasoning, decision trees, inductive logic programming, Gaussian process regression, group method of data handling, learning automata, random forests, ensembles of classifiers, ordinal classification, or conditional random field. For example, a neural network model can be used to analyze historical loading information; and to capture complex correlation between loading of the server system 100A and an optimized output power of the PSU 102 and the BBU 113, and/or selection of a specific AC source to deliver AC power to the PSU 102.

Figure 1B:
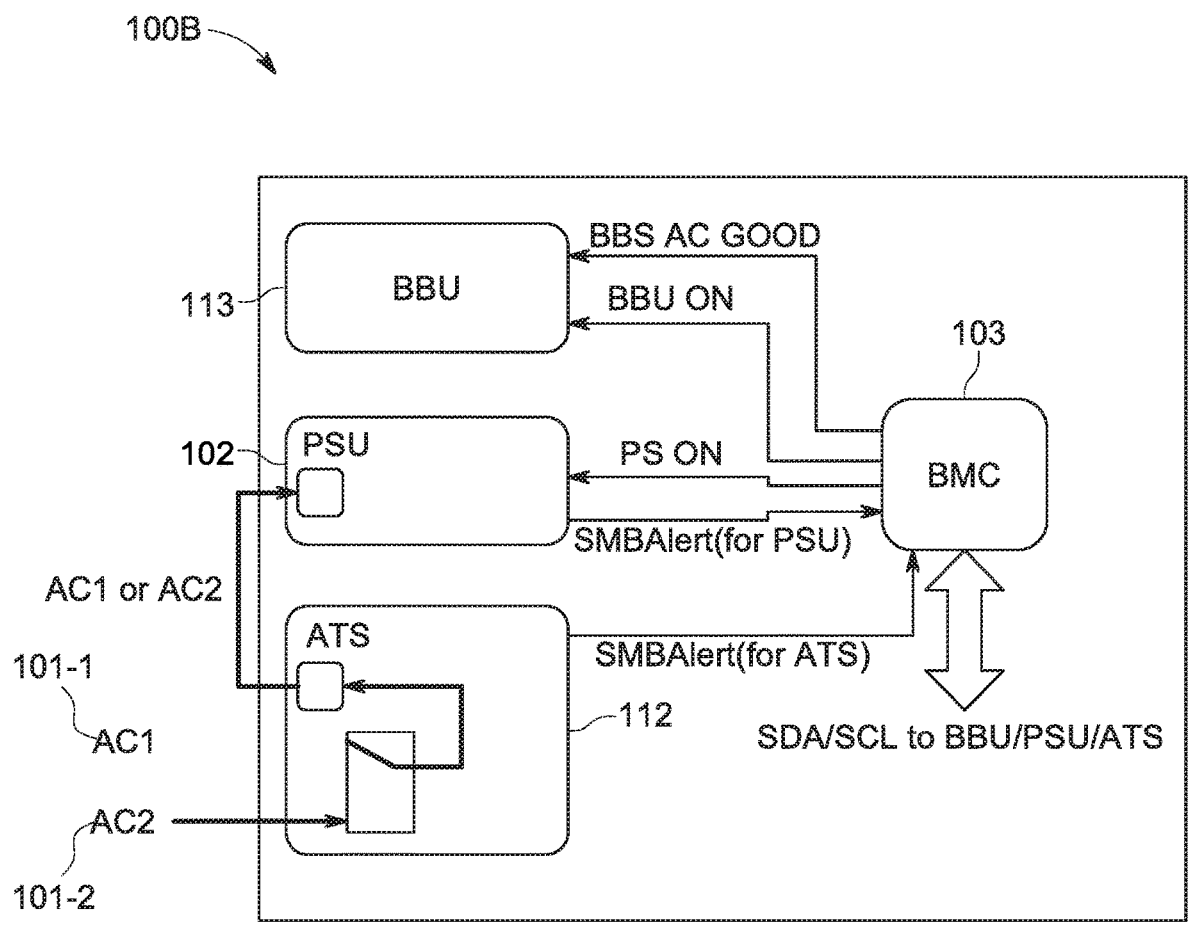
FIG. 1B is a schematic block diagram illustrating an exemplary system comprising a BMC, a PSU, an ATS and a BBU, in accordance with an implementation of the present disclosure.

A simplified view of the server system 100A is further illustrated in FIG. 1B. In this example, the server system 100B comprises the AC1 input 101-1, the AC2 input 101-2, the ATS 112, the PSU 102, the BBU 112, and the BMC 103. In response to the BMC 103's program being initiated, or any of the ATS 112, the PSU 102, the BBU 112 being plugged into the server system 100B, the BMC 103 can determine an identification of the device being plugged into, and redefine or define a specific pin of the BMC 103 based upon the identification.

For example, in response to determining that the new device is the BBU 113, the BMC 103 can redefine the #A22 input pin to an output pin (e.g., BBS AC GOOD) for the BBU 113. The BMC 103 can further manage the BBU 113 by sending a control signal via the output pin, and/or request the BBU 113 to supply back up power to the server system 100B via the output pin.

For another example, in response to determining that the new device is the PSU 102, the BMC 103 can define the #A22 input pin to the PSU 102; monitor a status of the PSU 102 (e.g., PSU ON and SMBAlert) via the #A22 input pin; manage the PSU 102; and send a control signal to the BBU 113 in an event that an AC power (e.g., the AC1 input 101-1 or the AC2 input 101-2) to the PSU 102 fails. In response to determining that the new device is the ATS 112, the BMC 103 can define the #A22 input pin to the ATS 112; monitor a status of the ATS 112 via the #A22 input pin; manage the ATS 112; and send a control signal to the BBU 113 in an event that AC power source(s) (e.g., both the AC1 input 101-1 and the AC2 input 101-2) to the ATS 112 fails. In this example, the BMC 103 sends the control signal to the BBU 113, the PSU 102, and the ATS 112 via an I2C bus (e.g., SCL/SDA lines).

In some implementations, the ATS 112, the PSU 102, and the BBU 113 are modularized into a plurality of ATS modules, a plurality of PSU modules, and a plurality of BBU modules, respectively. Each of the plurality of ATS modules, the plurality of PSU modules, and the plurality of BBU modules has substantially the same physical size.

In some implementations, each of the plurality of ATS modules can further include an over-current protection (OCP) circuit (not shown). The OCP circuit can be integrated into the ATS module, or is a discrete circuit. The OCP circuit is configured to cap an input current flowing through the ATS module and a paired PSU, such that an AC power input or other components of the server system 100B can be protected from current surges in case the ATS module or the paired PSU fails.

Although only certain components are shown within the exemplary systems 100A-100B in FIGS. 1A-1B, respectively, various types of electronic or computing components that are capable of processing or storing data, or receiving or transmitting signals, can also be included in the exemplary systems 100A-100B. Further, the electronic or computing components in the exemplary systems 100A-100B can be configured to execute various types of application, and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary systems 100A-100B, a variety of networking and messaging protocols can be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the exemplary systems 100A-100B illustrated in FIGS. 1A-1B, respectively, are used for purposes of explanation. Therefore, a network system can be implemented with many variations, as appropriate, yet still provide a configuration of network platform in accordance with various examples of the present disclosure.

In exemplary configurations of FIGS. 1A-1B, respectively, the exemplary systems 100A-100B can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various examples.

The above discussion is meant to be illustrative of the principles and various examples of the present disclosure. Numerous variations and modifications will become apparent once the above disclosure is fully appreciated.

Figure 2:
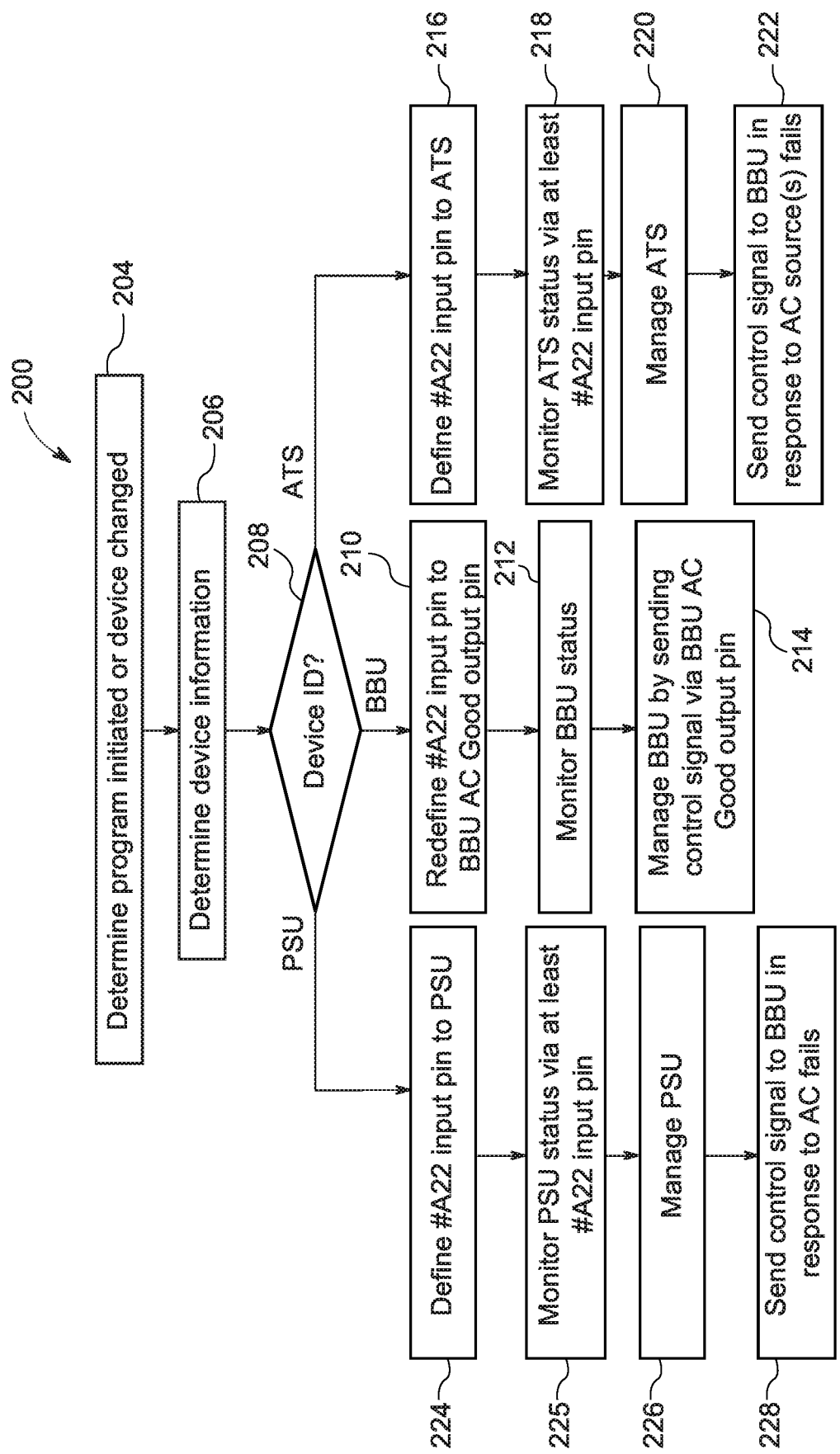
FIG. 2 is an exemplary method for managing a server system, in accordance with an implementation of the present disclosure.

FIG. 2 is an exemplary method 200 for managing a server system, in accordance with an implementation of the present disclosure. It should be understood that the exemplary method 200 is presented solely for illustrative purposes, and that other methods in accordance with the present disclosure can include additional, fewer, or alternative steps performed in similar or alternative orders, or in parallel. The exemplary method 200 starts at step 204 by determining a management controller program (e.g., BMC program) being initiated, or a device being changed in the server system. The device comprises an ATS, a PSU, and a BBU, as illustrated in FIGS. 1A and 1B.

At step 206, the management controller can determine device information. For example, the management controller can get the device information via a PMBus. At step 208, the management controller can determine whether the device is a BBU, an ATS, or a PSU. In some implementations, the device is a modularized BBU, ATS, or PSU.

At step 210, in response to determining the device is the BBU, the management controller can redefine a specific input pin of the management controller to a BBU output pin, as illustrated in FIG. 1B. The management controller can further monitor a status of the BBU via an inter-integrated circuit (I²C) bus (e.g., SCL/SDA lines), at step 212, and manage the BBU by sending a control signal via the BBU output pin, at step 214, which is illustrated in FIG. 1B.

At step 216, in response to determining the device is the ATS, the management controller can define the specific input pin of the management controller to an ATS input pin. The management controller can monitor a status of the ATS via the ATS input pin, at step 218, and manage the ATS via the I2C bus (e.g., SCL/SDA lines), at step 220, which is illustrated in FIG. 1B. At step 222, the management controller can send a control signal to the BBU in response to an AC source failure signal. In some implementations, the AC source failure signal indicates that any or all of AC sources to the ATS fails, or the ATS fails.

At step 224, in response to determining the device is the PSU, the management controller can define the specific input pin of the management controller to a PSU input pin. The management controller can monitor a status of the PSU via the PSU input pin, at step 225, and manage the PSU via the I2C bus (e.g., SCL/SDA lines), at step 226, which is illustrated in FIG. 1B. At step 228, the management controller can send a control signal to the BBU in response to an AC failure signal. In some implementations, the AC failure signal indicates that a specific AC source connected to the PSU fails, or the PSU fails.

Figure 3:
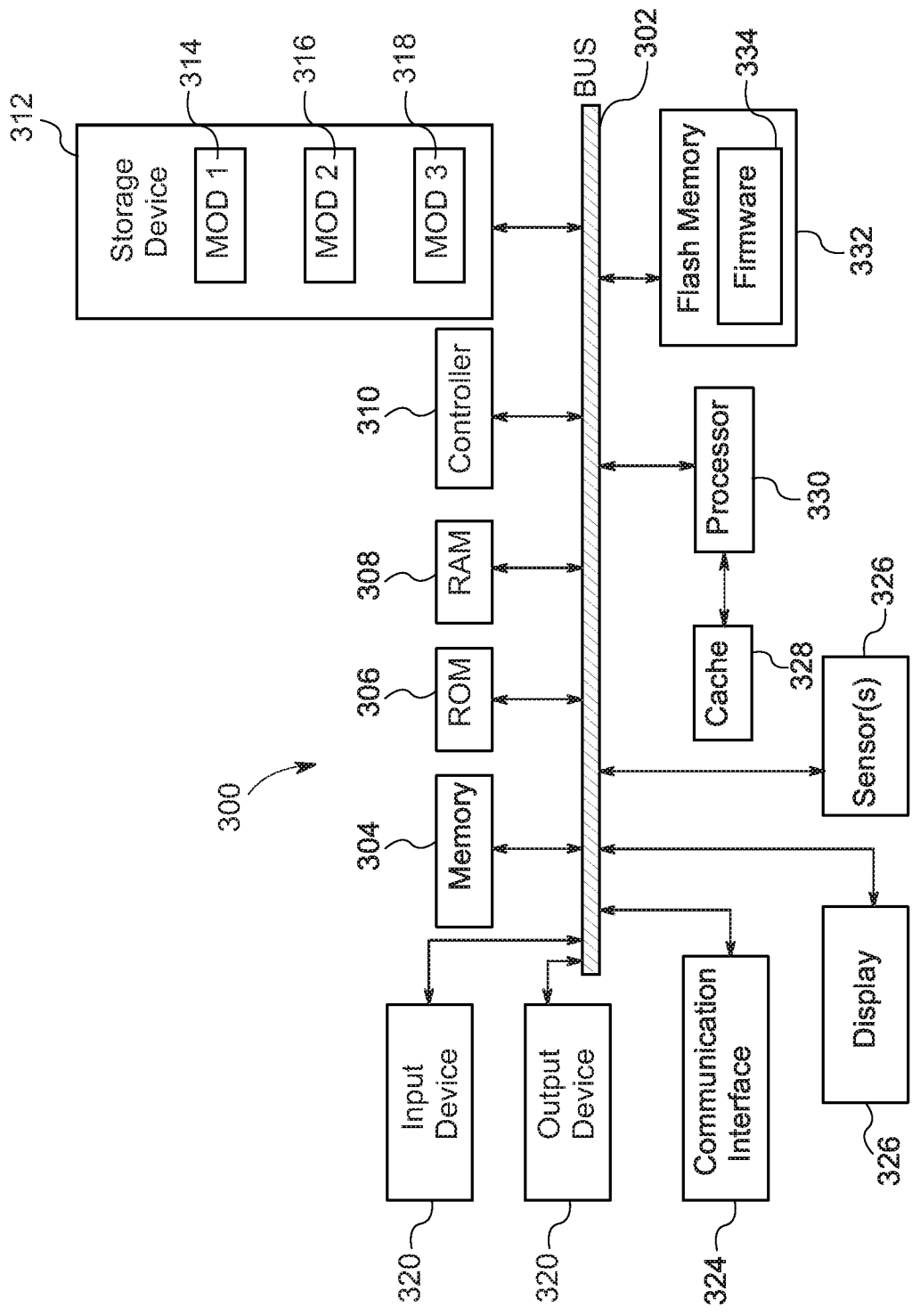
FIGS. 3 and 4 illustrate exemplary systems, in accordance with various examples of the present disclosure.
Figure 4:
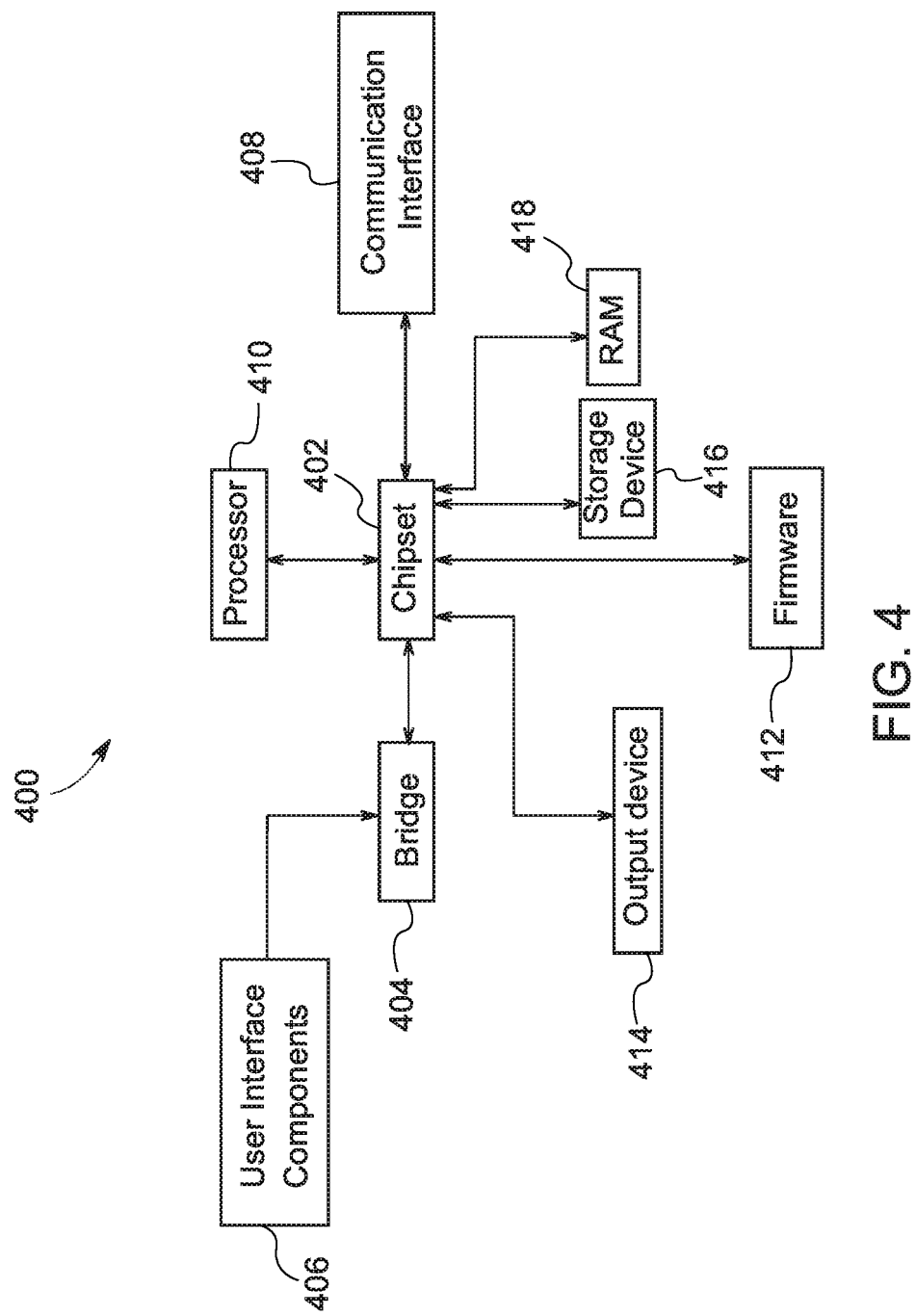

A brief introductory description of example systems and networks, as illustrated in FIGS. 3-4, is disclosed herein. These variations shall be described herein as the various examples are set forth. The present disclosure now turns to FIG. 3.

FIG. 3 illustrates an example computing system 300, in which components of the computing system are in electrical communication with each other using a bus 302. The system 300 includes a processing unit (CPU or processor) 330, and a system bus 302 that couples various system components, including the system memory 304 (e.g., read only memory (ROM) 306 and random access memory (RAM) 308), to the processor 330. The system 300 can include a cache of high-speed memory that is connected directly with, in close proximity to, or integrated as part of the processor 330. The system 300 can copy data from the memory 304 and/or the storage device 312 to the cache 328 for quick access by the processor 330. In this way, the cache can provide a performance boost for processor 330 while waiting for data. These and other modules can control or be configured to control the processor 330 to perform various actions. Other system memory 304 may be available for use as well. The memory 304 can include multiple different types of memory with different performance characteristics. The processor 330 can include any general purpose processor and a hardware module or software module, such as module 1 314, module 2 316, and module 3 318 embedded in storage device 312. The hardware module or software module is configured to control the processor 330, as well as a special-purpose processor where software instructions are incorporated into the actual processor design. The processor 330 may essentially be a completely self-contained computing system that contains multiple cores or processors, a bus, memory controller, cache, etc. A multi-core processor may be symmetric or asymmetric.

To enable user interaction with the computing device 300, an input device 320 is provided as an input mechanism. The input device 320 can comprise a microphone for speech, a touch-sensitive screen for gesture or graphical input, keyboard, mouse, motion input, and so forth. In some instances, multimodal systems can enable a user to provide multiple types of input to communicate with the system 300. In this example, an output device 322 is also provided. The communications interface 324 can govern and manage the user input and system output.

Storage device 312 can be a non-volatile memory to store data that are accessible by a computer. The storage device 312 can be magnetic cassettes, flash memory cards, solid state memory devices, digital versatile disks, cartridges, random access memories (RAMs) 308, read only memory (ROM) 306, and hybrids thereof.

The controller 310 can be a specialized microcontroller or processor on the system 300, such as a BMC (baseboard management controller). In some cases, the controller 310 can be part of an Intelligent Platform Management Interface (IPMI). Moreover, in some cases, the controller 310 can be embedded on a motherboard or main circuit board of the system 300. The controller 310 can manage the interface between system management software and platform hardware. The controller 310 can also communicate with various system devices and components (internal and/or external), such as controllers or peripheral components, as further described below.

The controller 310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 310 to initiate or conduct specific hardware recovery procedures or operations, as further described below.

The controller 310 can also include a system event log controller and/or storage for managing and maintaining events, alerts, and notifications received by the controller 310. For example, the controller 310 or a system event log controller can receive alerts or notifications from one or more devices and components, and maintain the alerts or notifications in a system event log storage component.

Flash memory 332 can be an electronic non-volatile computer storage medium or chip that can be used by the system 300 for storage and/or data transfer. The flash memory 332 can be electrically erased and/or reprogrammed. Flash memory 332 can include EPROM (erasable programmable read-only memory), EEPROM (electrically erasable programmable read-only memory), ROM, NVRAM, or CMOS (complementary metal-oxide semiconductor), for example. The flash memory 332 can store the firmware 334 executed by the system 300, when the system 300 is first powered on, along with a set of configurations specified for the firmware 334. The flash memory 332 can also store configurations used by the firmware 334.

The firmware 334 can include a basic input/output system or equivalents, such as an EFI (Extensible Firmware Interface) or UEFI (Unified Extensible Firmware Interface). The firmware 334 can be loaded and executed as a sequence program each time the system 300 is started. The firmware 334 can recognize, initialize, and test hardware present in the system 300 based on the set of configurations. The firmware 334 can perform a self-test, such as a POST (Power-on-Self-Test), on the system 300. This self-test can test functionality of various hardware components such as hard disk drives, optical reading devices, cooling devices, memory modules, expansion cards, and the like. The firmware 334 can address and allocate an area in the memory 304, ROM 306, RAM 308, and/or storage device 312, to store an operating system (OS). The firmware 334 can load a boot loader and/or OS, and give control of the system 300 to the OS.

The firmware 334 of the system 300 can include a firmware configuration that defines how the firmware 334 controls various hardware components in the system 300. The firmware configuration can determine the order in which the various hardware components in the system 300 are started. The firmware 334 can provide an interface, such as an UEFI, that allows a variety of different parameters to be set, which can be different from parameters in a firmware default configuration. For example, a user (e.g., an administrator) can use the firmware 334 to specify clock and bus speeds; define what peripherals are attached to the system 300; set thresholds of operation parameters (e.g., fan speeds and CPU temperature limits); and/or provide a variety of other parameters that affect overall performance and power usage of the system 300. While firmware 334 is illustrated as being stored in the flash memory 332, one of ordinary skill in the art will readily recognize that the firmware 334 can be stored in other memory components, such as memory 304 or ROM 306.

System 300 can include one or more sensors 326. The one or more sensors 326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 326 can communicate with the processor, cache 328, flash memory 332, communications interface 324, memory 304, ROM 306, RAM 308, controller 310, and storage device 312, via the bus 302, for example. The one or more sensors 326 can also communicate with other components in the system via one or more different means, such as inter-integrated circuit (I2C), general purpose output (GPO), and the like. Different types of sensors (e.g., sensors 326) on the system 300 can also report to the controller 310 on parameters, such as cooling fan speeds, power status, operating system (OS) status, hardware status, and so forth.

FIG. 4 illustrates an example computer system 400 having a chipset architecture that can be used in executing the described method(s) or operations, and in generating and displaying a graphical user interface (GUI). Computer system 400 can include computer hardware, software, and firmware that can be used to implement the disclosed technology. System 400 can include a processor 410, representative of a variety of physically and/or logically distinct resources capable of executing software, firmware, and hardware configured to perform identified computations. Processor 410 can communicate with a chipset 402 that can control input to and output from processor 410. In this example, chipset 402 outputs information to output device 414, such as a display, and can read and write information to storage device 416, which can include magnetic media, and solid state media, for example. Chipset 402 can also read data from and write data to RAM 418. A bridge 404 for interfacing with a variety of user interface components 406, can be provided for interfacing with chipset 402. Such user interface components 406 can include a keyboard, a microphone, touch detection and processing circuitry, a pointing device, such as a mouse, and so on. In general, inputs to system 400 can come from any of a variety of sources, machine generated and/or human generated.

Chipset 402 can also interface with one or more communication interfaces 408 that can have different physical interfaces. Such communication interfaces can include interfaces for wired and wireless local area networks, for broadband wireless networks, and for personal area networks. Further, the machine can receive inputs from a user via user interface components 406 and execute appropriate functions, such as browsing functions by interpreting these inputs using processor 410.

Moreover, chipset 402 can also communicate with firmware 412, which can be executed by the computer system 400 when powering on. The firmware 412 can recognize, initialize, and test hardware present in the computer system 400 based on a set of firmware configurations. The firmware 412 can perform a self-test, such as a POST, on the system 400. The self-test can test the functionality of the various hardware components 402-418. The firmware 412 can address and allocate an area in the memory 418 to store an OS. The firmware 412 can load a boot loader and/or OS, and give control of the system 400 to the OS. In some cases, the firmware 412 can communicate with the hardware components 402-410 and 414-418. Here, the firmware 412 can communicate with the hardware components 402-410 and 414-418 through the chipset 402, and/or through one or more other components. In some cases, the firmware 412 can communicate directly with the hardware components 402-410 and 414-418.

It can be appreciated that example systems 300 and 400 can have more than one processor (e.g., 330, 410), or be part of a group or cluster of computing devices networked together to provide greater processing capability.

For clarity of explanation, in some instances, the present disclosure may be presented as including individual functional blocks, such as devices, device components, steps or routines in a method embodied in software, or combinations of hardware and software.

In some implementations, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used, can be accessible over a network. The computer executable instructions may be, for example, binaries and intermediate format instructions, such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executing in a single device, by way of further example.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless, and handheld devices running mobile software, and capable of supporting a number of networking and messaging protocols. Such a system can also include a number of workstations running any of a variety of commercially-available operating systems, and other known applications for purposes such as development and database management. These devices can also include other electronic devices, such as dummy terminals, thin-clients, gaming systems, and other devices capable of communicating via a network.

To the extent examples, or portions thereof, are implemented in hardware, the present disclosure can be implemented with any, or a combination of, the following technologies: a discreet logic circuit(s) having logic gates for implementing logic functions upon data signals; an application specific integrated circuit (ASIC) having appropriate combinational logic gates; programmable hardware such as a programmable gate array(s) (PGA); and/or a field programmable gate array (FPGA); etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Devices implementing methods, according to these technologies, can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

In examples that utilize a Web server, the Web server can run any variety of server or mid-tier applications, including HTTP servers, FTP servers, CGI servers, data servers, Java servers, and business application servers. In response to requests from user devices, the Web server(s) can also be capable of executing programs or scripts. For example, the Web server can execute one or more Web applications, which can be implemented as one or more scripts or programs written in any programming language, such as Java®, C, C# or C++ or any scripting language, such as Perl, Python or TCL, as well as combinations thereof. The Web server(s) can also encompass database servers, including those commercially available on the open market.

The server system can include a variety of data stores and other memory and storage media, as discussed above. These can reside in a variety of locations, such as on a storage medium local to (and/or resident in) one or more of the computers, or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad), and at least one output device (e.g., a display device, printer or speaker). Such a system can also include one or more storage devices, such as disk drives, optical storage devices, and solid-state storage devices such as random access memory (RAM) or read-only memory (ROM), as well as removable media devices, memory cards, flash cards, etc.

Storage media and computer readable media for containing code, or portions of code, can include any appropriate media known or used in the art, including, but are not limited to, removable and non-removable media for storage and/or transmission of data or information. The removable and non-removable media comprise RAM, ROM, EPROM, EEPROM, flash memory or other memory technology, CD-ROM, digital versatile disk (DVD) or other optical storage, magnetic cassettes, magnetic tape, magnetic disk storage, or other magnetic storage devices that can be used to store the desired information and that can be accessed by a system device. The data or information can include computer readable instructions, data structures, program modules, or other data. Based on the technology and teachings provided herein, a person of ordinary skill in the art will appreciate other ways and/or methods to implement the various aspects of the present disclosure.

The specification and drawings are, accordingly, to be regarded in an illustrative rather than a restrictive sense. It will, however, be evident that various modifications and changes can be made thereunto without departing from the broader spirit and scope of the patent application, as set forth in the claims.

What is claimed is:

1. A computer-implemented method for managing a computing device, comprising:
    determining, by a management controller of the computing device, a device being plugged in, the device comprising one of a power supply unit (PSU), an automatic transfer switch (ATS), or a battery backup unit (BBU) of the computing device, wherein the management controller includes a specific input pin operable to send or receive signals from the plugged in device;
    determining, by the management controller, an identification (ID) of the device;
    in response to determining the device is the BBU, redefining the specific input pin of the management controller to a BBU output pin to send control signals through the redefined BBU output pin to the BBU;
    monitoring a status of the BBU; and
    managing the BBU by the management controller generating a first control signal to supply backup power to the computing device, and sending the generated first control signal via the redefined BBU output pin to the BBU; and
    in response to determining the device is the ATS, defining the specific input pin of the management controller to an ATS input pin to receive status signals from the ATS;
    monitoring a status of the ATS via the defined ATS input pin;
    managing the ATS;
    receiving an AC source failure signal from the ATS from the defined ATS input pin; and
    sending a second control signal to the BBU in response to the AC source failure signal.

2. The computer-implemented method of claim 1, wherein the AC source failure signal indicates a condition that any of or all AC sources to the computing device have failed, and/or the ATS has failed.

3. The computer-implemented method of claim 1, wherein the management controller manages the ATS via an inter-integrated circuit ($I^2C$) bus.

4. The computer-implemented method of claim 1, further comprising:
    in response to determining the device is the PSU, defining the specific input pin of the management controller to a PSU input pin to receive status signals from the PSU;
    monitoring a status of the PSU via the PSU input pin;
    managing the PSU;
    receiving an AC source failure signal from the PSU from the defined PSU input pin; and
    sending a third control signal to a BBU in response to the AC failure signal.

5. The computer-implemented method of claim 4, wherein the AC failure signal indicates a condition that an AC source connected to the PSU has failed, and/or the PSU has failed.

6. The computer-implemented method of claim 4, wherein the management controller manages the PSU via an $I^2C$ bus.

7. The computer-implemented method of claim 1, wherein the PSU, the ATS, and the BBU are modularized into a plurality of ATS modules, a plurality of PSU modules, and a plurality of BBU modules, respectively.

8. The computer-implemented method of claim 7, wherein each of the plurality of ATS modules, the plurality of PSU modules, and the plurality of BBU modules has substantially the same physical size.

9. A computing device, comprising:
    a processor;
    a management controller;
    a device comprising one of a battery backup unit (BBU); a power supply unit (PSU); or an automatic transfer switch (ATS); and
    a computer-readable medium storing instructions that, when executed by the processor, cause the computing device to perform operations comprising:
    determining, by a management controller of the computing device, the device being plugged in, wherein the management controller includes a specific input pin operable to send or receive signals from the plugged in device;
    determining, by the management controller, an identification (ID) of the device;
    in response to determining the device is the BBU, redefining the specific input pin of the management controller to a BBU output pin to send control signals through the redefined BBU output pin to the BBU;
    monitoring a status of the BBU; and
    managing the BBU by the management controller generating a first control signal to supply backup power to the computing device, and sending the generated first control signal via the redefined BBU output pin to the BBU; and
    in response to determining the device is the ATS, defining the specific input pin of the management controller to an ATS input pin to receive status signals from the ATS;
    monitoring a status of the ATS via the defined ATS input pin;
    managing the ATS;
    receiving an AC source failure signal from the ATS from the defined ATS input pin; and
    sending a second control signal to the BBU in response to the AC source failure signal.

10. The computing device of claim 9, wherein the AC source failure signal indicates a condition that any of or all AC sources to the computing device have failed, and/or the ATS has failed.

11. The computing device of claim 9, further comprising a BBU, and wherein the computer-readable medium storing instructions that, when executed by the processor, further cause the computing device to perform operations comprising:

in response to determining the device is the PSU, defining the specific input pin of the management controller to a PSU input pin to receive status signals from the PSU; monitoring a status of the PSU via the PSU input pin; managing the PSU; receiving an AC source failure signal from the ATS from the defined ATS input pin; and sending a second control signal to the BBU in response to the AC failure signal.

12. The computing device of claim 11, wherein the AC failure signal indicates a condition that an AC source connected to the PSU has failed, and/or the PSU has failed.

13. The computing device of claim 11, wherein the management controller manages the PSU via an I²C bus.

14. The computing device of claim 9, wherein the PSU, the ATS, and the BBU are modularized into a plurality of ATS modules, a plurality of PSU modules, and a plurality of BBU modules, respectively.

15. The computing device of claim 14, wherein each of the plurality of ATS modules, the plurality of PSU modules, and the plurality of BBU modules has substantially the same physical size.

16. A non-transitory computer-readable storage medium including instructions that, when executed by at least one processor of a computing device, cause the computing device to perform operations comprising:

determining, by a management controller of the computing device, a device being plugged in, the device comprising one of a power supply unit (PSU), an automatic transfer switch (ATS), or a battery backup unit (BBU) of the computing device, wherein the management controller includes a specific input pin operable to send or receive signals from the plugged in device;

determining, by the management controller, an identification (ID) of the device;

in response to determining the device is the BBU, redefining the specific input pin of the management controller to a BBU output pin to send control signals through the redefined BBU output pin to the BBU;

monitoring a status of the BBU; and managing the BBU by the management controller generating a first control signal to supply backup power to the computing device, and sending the generated first control signal via the redefined BBU output pin to the BBU; and in response to determining the device is the ATS, defining the specific input pin of the management controller to an ATS input pin to receive status signals from the ATS;

monitoring a status of the ATS via the defined ATS input pin;

managing the ATS;

receiving an AC source failure signal from the ATS from the defined ATS input pin; and sending a second control signal to the BBU in response to the AC source failure signal.

17. The computer-implemented method of claim 1, wherein the management controller is operable to:

monitor temperature data from at least one component of the computing device; and control a cooling device to increase or decrease cooling of the at least one component.

18. The computing device of claim 9, wherein the management controller is operable to:

monitor temperature data from at least one component of the computing device; and control a cooling device to increase or decrease cooling of the at least one component.

* * * * *